SIGNALLING DEVICE PARTICULARLY IN MINIATURE RADIO RECEIVERS FOR PAGING SYSTEMS
Filed Feb. 25, 1966
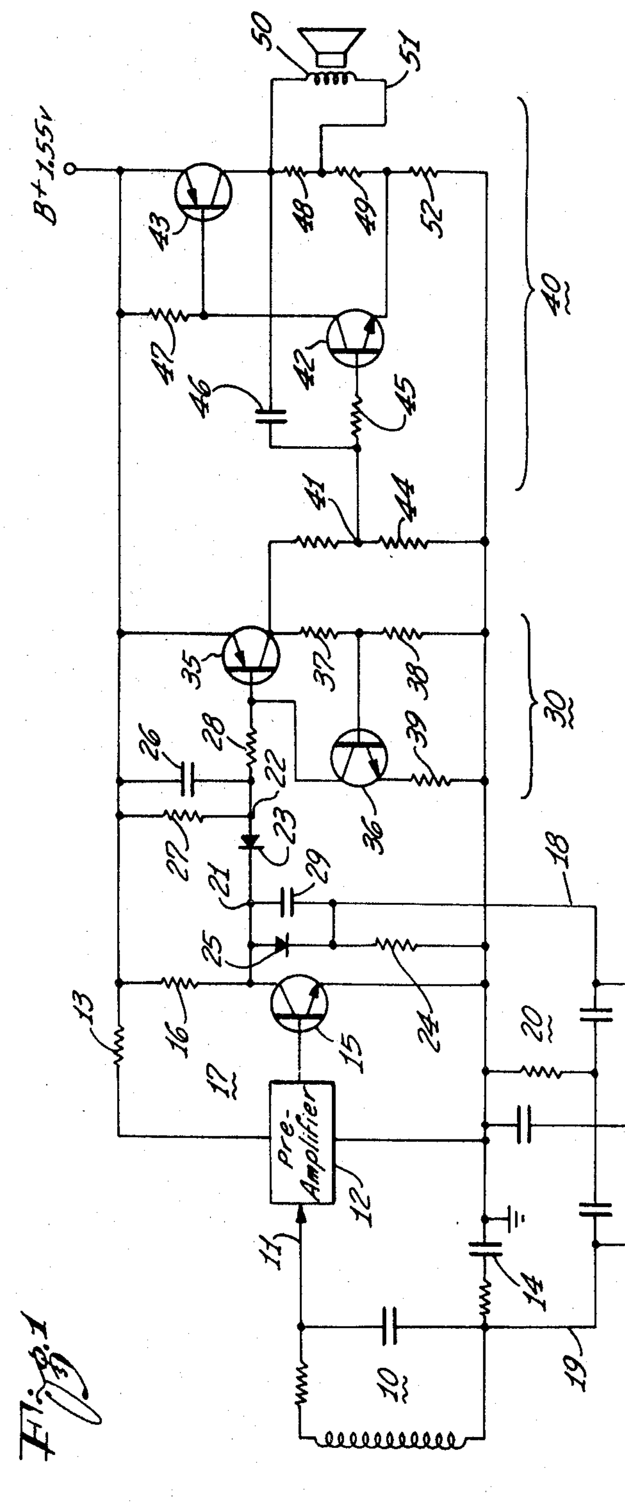
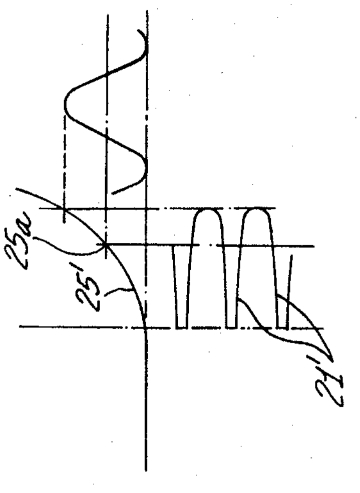
Fig. 2
INVENTC
CHARLES O. FOR
By Smyth, Roston & Pav
ATTORNE.

United States Patent Office 3,467,869
Patented Sept. 16, 1969

3,467,869
SIGNALLING DEVICE PARTICULARLY IN MINIATURE RADIO RECEIVERS FOR PAGING SYSTEMS

Charles O. Forge, Cupertino, Calif., assignor to Donald W. Stillman, Playa Del Rey, California Filed Feb. 25, 1966, Ser. No. 530,167
Int. Cl. H04b *1/06*
U.S. Cl. 325—466 23 Claims

ABSTRACT OF THE DISCLOSURE

A paging receiver is disclosed having an input tank circuit, an amplifier with twin T filter feedback, a waveform distorting detector, a switch, and a free running multivibrator with loudspeaker.

The present invention relates to a miniature radio receiver to provide an indication when receiving a signal of a particular frequency to which the receiver is tuned.

A receiver of the type referred to is used, for example, in a paging system. A paging system comprises a centrally located transmitter capable of issuing characteristic signals and having selection means to vary the characteristics, for example, frequency of the transmitted signals. Individual receivers are carried by people who may have to be paged, and each person has a receiver with a "personalized" characteristics causing uniquely his receiver to respond to the exclusion of others when the particular characteristics is broadcast. These paging systems, for example, operate with a plurality of different frequencies and each receiver is tuned to a particular one. The receiver when receiving the frequency to which it is tuned will respond and produce a visible or, preferably, an audible signal. As a person who may have to be paged must carry such a receiver, it must be very small and light not to constitute a burden or hindrance.

A receiver to be useful for this purpose must operate on a very low voltage to permit operation by a single miniature battery. The receiver must be responsive to a particular frequency while rejecting other paging signals. Since a paging system of this type is to be used primarily in buildings, very low frequencies are to be used. As the supply voltage is a low one, ambient temperature changes may influence the operation, but the response of the receiver must be independent from the temperature changes.

Another problem is to be seen in the fact that very long wave lengths have to be used as paging frequencies. If the alerting portion of a receiver is a loudspeaker, buzzer or the like, care must be taken that the energization of the loudspeaker does not develop stray signals which feed back into the antenna of the receiver.

The receiver in accordance with the present invention meets all of these requirements. There is first provided a high gain transistor amplifier having its input side coupled to an antenna loop which is tuned to a range of frequencies which includes the particular frequency to which this receiver is to respond. The amplifier output, particularly the electrode of the transistor pertaining to the output stage is connected via a series diode to the input side of a narrow bandstop filter such as a twin-T. The output of the twin-T connects to the antenna loop. The twin-T has a bandstop frequency equal to the characteristic receiver response frequency.

The amplifier with twin-T feedback constitutes an active filter. The diode is biased so that the quiescent potential level at the diode electrode which is connected to the amplifier output, is in the low voltage, non-linear region of the voltage-current characteristics of the diode. The connection of amplifier output terminal and diode input terminal serves as the output terminal of the active filter. As the active filter forces a sinusoidal current to flow in the diode as soon as the antenna picks up its characteristic frequency, an asymmetrical voltage waveform is developed at the output terminal of the active filter. This ensures a sufficient signal strength without requiring marginal biasing conditions.

A switching transistor connects with its base electrode to this electrode output terminal of the active filter via a rectifier, and there are provided biasing means so that the quiescent level as well as the biasing level for zero input at the antenna, maintains the switching transistor non-conductive. If the antenna receives the characteristic frequecy, excursions distorted in one direction are developed at the diode electrode and rectified, causing base current to flow in the switching transistor thereby rendering the transistor conductive. In order to provide steep switching flanks at the transistor output, a second transistor is coupled to the switching transistor so that change of states in either direction are regeneratively reinforced.

The output signal provided at one electrode of the switching transistor is a D.C. voltage block of steep leading and trailing edges marking a period or reception of a signal having the characteristic frequency of the active filter. An oscillator providing audio frequency oscillations is connected to be enabled by the D.C. voltage block when provided by the switching transistor. The oscillator has two transistors interconnected in a loop to regeneratively turn each other on and off, for concurrent states of conduction and concurrent states of non-conduction. The loop, on one hand responds to the enabling voltage block for enabling the oscillator and includes on the other hand, a capacitor alternating its charge thereby alternatingly either overriding or reinforcing the effect of the enabling voltage block, so that the transistors are concurrently and alternatingly rendered conductive and nonconductive. The transistors control a loudspeaker reproducing the oscillations audible signal.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing, in which:

FIGURE 1 illustrates schematically a circuit diagram of the preferred embodiment in accordance with this invention; and FIGURE 2 illustrates the voltage versus current diagram of a diode in the circuit shown in FIGURE 1.

Proceeding now to the detailed description of the drawings in FIGURE 1 thereof there is shown a circuit diagram of the receiver circuit to be operated at a very low voltage such as 1.55 volts, derivable from a small battery. The input circuit of this receiver is comprised of a tank circuit 10 having a signal pickup coil and a shunted capacitor broadly tuned to a particularly frequency range to which the receivers are to respond. In accordance with the general system of which such a receiver is a part, this receiver is tuned to a particular one of a plurality of paging signal frequencies. This particular frequency is exclusively assigned to that particular receiver; whenever a signal of this frequency is transmitted from a central paging station, only this receiver will respond. The bandwidth of response of the receiver is to be a very narrow one, so that the various frequencies of the paging system do not nave to cover a wide range.

Neither part of the tank circuit 10 is grounded so that it is kept at floating potential which is important for considerations below. One terminal part of the tank circuit connects, by means of the line 11, to the input side of an amplifer 17 having a preamplifier stage 12 which, for example, may be a two-stage transistor amplifier of known configuration. The preamplifier 12 receives the battery supply voltage B+ via a resistor 13 which is provided for purposes of decoupling. The reference potential of this preamplifier 12 is provided by ground. A capacitor 14 connects the other side of the tank circuit 10 to ground in order to compensate for high frequency characteristics of the transistors of amplifier 17 to prevent oscillations.

The preamplifier 12 provides its output signal to the base electrode of an output amplifier comprised of a transistor 15 having a collector circuit resistor 16 and a grounded emitter. The collector electrode of this transistor 15 is connected to or serves as output teminal 21 for the entire amplifier 17 which is composed of the elements 12 and 15.

The collector electrode of transistor 15 or the terminal 21 connects to a line 18 through elements to be described below in greater detail, and it should be noted specifically that this connection to the line 18 is provided with a D.C. coupling path running from B+ via the collector electrode of transistor 15 to line 18. The line 18 serves as input of a twin-T circuit 20 of known configuration. The twin-T filter is a narrow bandstop filter and has a notch frequency in its band which is the frequency of response of this receiver.

An output line 19 connects the output side of twin-T 20 to the tank circuit 10. Thus, the antenna circuit is connected in series between the twin-T and the preamplifier input. It should be noted that the lines 18 and 19 provide a feedback path which has a D.C. continuity but not to ground. This feedback path is provided between the collector electrode of transistor 15 and the tank circuit 10.

The amplifier 17 has a basic voltage gain of about 1000 and the twin-T network 20 provides overall D.C. feedback. Each transistor of amplifier 17 operates at the voltage determined by the base emitter drop of the respective following transistor and each has a bias current determined by the difference between this drop and the battery voltage applied across its respective load resistor. It is also worth mentioning that one of the advantages of the active configuration is the total, high loop-gain D-C feedback achieved through the use of direct coupling as there are no coupling capacitors in the loop. This causes the transistor bias conditions to be almost unaffected by saturation currents.

Upon application of a sufficiently large input signal having a frequency $f_0$, it is desired that the amplifier 17 provides a signal at output terminal 21 which suffices to operate a switching device 30. The switch 30 is designed to operate with D.C. input signals. The switching states of switch 30 are determined by the input, no-input conditions of the output provided by amplifier 17, whereby the input is the A.C. signal of frequency $f_0$. Hence, a rectifier is interposed between the terminal 21 and the input for the switch 30.

The rectifier is comprised of a diode 23 having its cathode connected to terminal 21, and its anode is connected via a resistor 27 to B+, there being a capacitor 26 connected in parallel. The diode 23 is a one-way rectifier which responds to excursions rendering the cathode more negative. The capacitor 26 maintains the D.C. potential at the anode as resulting from these excursions. The junction 22 of the anode of diode 23, capacitor 26 and of resistor 27 connects to the input side of the switch 30. The switch 30 will be described in detail below. Presently it suffices to state, that its principal active element is a transistor 35 the base of which is controlled by the potential at terminal 22. Resistor 27 and diode 23 provide a series circuit path which is parallel to resistor 16, but resistor 27 has a resistive valve considerably above that of resistor 16 so that the collector current for transistor 15 predominantly flows through resistor 16.

A distinct problem exists in the requirement of providing for sufficient discriminating signal strength at the point 21 or 22 whereby "sufficient" means that there must be provided two different definite operating states which describe or define distinctively a reception of a signal of frequency $f_0$ and the absence of reception of a such a signal. A signal is regarded as being sufficient when it causes the amplifier 17 to operate the switch circuit 30.

In particular the switch 30 is regarded as "off" when switching transistor 35 is non-conductive and this condition is to exist when no signal is received by the antenna, i.e., the operation conditions are selected so that the potential established at point 22 shall cut the transistor 35 off in order to provide for low battery drain whenever the receiver does not receive its characteristic frequency. Upon reception of a signal at the frequency $f_0$ as received by the tank circuit 10, the switch 30 shall turn on, i.e., the transistor 35 is to be rendered conductive. These are the operating conditions.

It can be required that the transistor switch operates for each separate cycle of the input frequency or just detect the peak amplitude and convert it to a D.C. current, the problems are similar either way. The simplest configuration is one in which the detection of A.C. peaks of different amplitude causes the transistor 35 to be turned on, and the D.C. potential established by such peaks is maintained by capacitor 26. This particular configuration is described here.

Upon receiving an input signal of frequency $f_0$, a negative excursion at the base of transistor 15 will tend to cut the transistor off, while a positive excursion results in heavy conduction. Positive and negative are here understood as referring to the change of potential relative to the potential level maintained when there is no input signal. Since the maximum available peak current from the amplifier 17 is limited, for positive output excursions, to the low bias value as defined by the resistive value of resistor 16, but since the negative current peaks can be many times this value because of heavy conduction of the transistor 15 when turned on by positive peaks, the negative current direction has been chosen to turn on the switching transistor 35.

For these operating conditions it has to be considered that some D.C. bias is needed between the twin-T filter 20 and the base of transistor 35. For this reason a resistor 24 is provided operating in voltage divider configuration together with the diode 25. The further function of the diode 25 will be described below.

Since there is a D.C. continuity between the lines 18 and 19, and since there is D.C. continuity through the amplifier, the line 18 is held at a fixed D.C. potential. Any change in potential of line 18 will be corrected speedily through feedback running through the twin-T filter into the input of preamplifier 12 and through the entire amplifier 17 to the output thereof. In actuality the high gain of the amplifier locks the D.C. potential of line 18 and does not permit any change to occur. This fixed potential of line 18 determines a current through resistor 24 and this current flows practically exclusively through diode 25, so that thereby the potential of the anode of diode 25 (point 21) is determined in accordance with the D.C. resistance of the diode at that current. This bias of point 21 is selected so that very litle current flows through rectifier diode 23. Thus, the potential of point 22 is very close to the B+ potential and transistor 35 is cut off accordingly. These D.C. biasing conditions prevail during the periods when no input is received by the tank circuit 10, or when signals having frequencies other than $f_0$ are received.

Because of the shorting action of the base emitter current for transistor 35 on negative signal peaks at point 21, the negative peak by action of the amplifier 17 together with the twin-T filter 20 is effectively shorted momentarily at each output cycle. The full, very high amplifier gain of amplifier 17 drives the transistor 15 into conduction upon occurrence of a positive excursion at the base of transistor 15 and resulting during a particular phase of an input signal in tank circuit 10. A capacitor 29 is provided to cause phase lead around the twin-T loop during signal half-cycles when diode 25 is cut off, to eliminate high frequency oscillations. On each signal peak of sufficient amplitude for rendering transistor 15 conductive potential at point 21 drops, rectifier 23 increases conduction and a resulting current in the base emitter path of transistor 35 thus turn this transistor on. The capacitor 26 establishes a new D.C. potential at point 22 to maintain the on state of transistor 35.

A basic problem, however, exists that these operating conditions exist satisfactorily only at a fixed temperature. One of the basic properties of a semi-conductor junction including that of transistors is the temperature dependence of the voltage drop across the junction at a constant forward current. As a general rule one can say roughly that the forward drop at a constant current decreases at the rate of 2 to 5 millivolts per degree centigrade temperature rise. This is true for transistor base emitter junctions as well as for simple diodes.

It now has to be considered that the D.C. potential at the collector electrode of transistors 15 (point 21) is controlled by feedback action resulting from the voltage divider path as established by resistor 16, diode 25 and resistor 24, and twin-T filter 20, and the base potential at the input transistor of preamps 12. Hence, a temperature change at the junctions of preamps input transistor is reinforced to become effective twice the actual junction drop. For the following analysis, it shall be assumed, that element 25 is a normal, i.e., bidirectionally uniform resistor.

In case of temperature changes, the voltage necessary across the base emitter path of transistor 35 to start conduction is decreasing at about 3 millivolts per degree centigrade. This latter drop is measured down from the B+ supply line. Thus, the necessary positive voltage measured from the ground to maintain transistor 35 non-conductive in the absence of an input signal increases with temperature by approximately 3 millivolts per centrigrade.

The available voltage for maintaining this cut-off condition is established at point 21, i.e., by the collector electrode potential of transistor 15. This potential now decreases by 6 millivolts per degree centigrade, unfortunately in the wrong direction. This means that to avoid having transistor 35 permanently conductive at a high temperature with this circuit, a great deal of "slack" must be left. At room temperature the collector voltage of transistor 15 must thus be very close to the B+ voltage so that a decrease thereof at rising temperature will not cause the transistor 35 to be turned on even in the absence of an input signal, but merely by the bias.

In order to keep the transistor 35 off at zero input signal condition, the quiescent potential across resistor 16 must be below 0.6 volt at the maximum temperature to be expected. At lower temperature this voltage difference measured from B+ decreases (in the right direction). If now at such biasing conditions a signal of frequency $f_0$ is received, the frequency filtering action of the twin-T filter causes the current waveform at the twin-T input to be a symmetrical sine wave about the quiescent D.C. value. The voltage waveform at point 21 will always remain symmetrical about the quiescent potential prevailing at terminal 21; (here now assuming that element 25 is an ordinary resistor).

If this quiescent voltage is too close to the supply, positive peak clipping due to transistor cutoff of transistor 15 will occur before the negative peaks reach sufficient amplitude to turn the transistor 35 on. This clipping rather than merely flattening the positive peaks actually limits the amplitude of the entire waveform at or very near the level at which clipping first begins. This is due to wavefrom purity forced by the frequency selective action of the active filter network.

The overall operation of amplifier 17 together with the twin-T filter 20 prevents the development of any other than a pure sine wave at the output terminal 21. The amplitude limiting as described above will result in a reduction in effective gain and will prevent the negative peaks from reaching a negative level sufficient to turn transistor 35 if the quiescent voltage is too closely biased to the supply voltage.

To operate under this restriction, forces a marginal design in which the voltage bias level of terminal point 21 must be quite close to the level which will turn transistor 35 on at the lowest operating temperature. At high temperatures the reduced base voltage necessary to turn transistor 35 on, together with a lowering of the voltage at point 21 due to temperature influence in the amplifier will result in a permanent turning on of transistor 35, merely by the change in bias and even in the absence of any $f_0$ input signal. This is an undesired mode of operation.

If the D.C. potential at terminal 21 is set to not quite turn on transistor 35 at maximum temperature, then at a lower temperature the D.C. biasing potential at terminal 21 will become closer to its positive going limit, which is cutoff of transistor 15, than the relative extension of its negative excursion necessary to turn transistor 35 on, and non-operation of transistor 35 will result even for a very large input in the tank circuit 10.

This deficiency is remedied by the provision of the diode 25 in lieu of an ordinary resistor. Particularly, diode 25 provides a D.C. current path from the amplifier output to the twin-T input. In addition, a particular operating bias has been selected and will be described next. It will be remembered that the problem is caused by symmetry imposed on voltage waveform at terminal 21 by action of the twin-T filter 20, and of amplifier 17 which forces a sinusoidal waveform in line 18 regardless of any clipping action and thereby reduces the effective amplitude. The twin-T has almost resistive input impedance at signal frequency. Upon receiving a signal of proper frequency, the overall circuit action forces the symmetrical sine wave voltage to appear at the twin-T input so its input current has to be a symmetrical sine wave too. Here, however, it will be appreciated, that it is not the amplifier output side but the input side of the twin-T where a sinusoidal waveform is enforced. If there is only linear coupling between amplifier and twin-T, this distinction is a moot one. However, if a nonlinear device such as the forward biased semiconductor diode 25 is connected between the collector of transistor 15 and the twin-T input line 18, the high loop gain of the system will thus force a symmetrical sine wave current through the diode 25 and into the twin-T filter. This means, that the voltage at the junction of the cathode of diode 25 at resistor 24 is sinusoidal, but the anode potential at point 21 is distorted.

FIGURE 2 illustrates representatively the effect of diode 25. Trace 25' is the current (vertical) versus voltage (horizontal) characteristics. D.C. bias is established at point 25*a* and maintained throughout by the D-C loop gain of the amplifier. An input current forced into diode 25 will oscillate sinusoidally about the horizontal dash-dot line. The resulting voltage across diode 25 will then necessarily follow the distorted curve 21' oscillating about the vertical dash-dot line; this voltage is effective at terminal 21.

If the negative going peak A.C. component of the diode current approaches or exceeds the D.C. bias current, the diode becomes a high A.C. resistance and hence requires a large collector voltage swing at the collector electrode of transistor 15 to cause the required sine wave current to flow through it. Negative and positive, of course, are here related to the D.C. bias level; the entire circuit operates only on positive potential. On positive half cycles the A.C. impedance of the diode 25 drops and very little collector current in transistor 15 is required to pass a large current into the twin-T input.

Due to the exponential nature of the voltage versus current characteristics of a diode such as 25, the A.C. slope resistance is related inversely to instantaneous forward current. This is true for all semiconductors regardless of size. This is true even if the collector of transistor 15 is biased very close to the supply, as long as the diode 25 is biased to a low enough current so that the peak A.C. current on the negative voltage swing exceeds diode bias at a, relatively speaking, lower signal level than analogously required in the opposite direction to cut transistor 15 off at positive peaks. This relation allows terminal 21 to be biased very close to the supply so that transistor 35 will never be turned on permanently due to a temperature dependent change in the bias.

On the other hand a very strong current pulse can be driven through rectifier 23 and thus into the base of transistor 35 by the very unsymmetrical voltage waveform caused by diode cutoff. At each negative excursion (portions 21') the potential at point 21 is drastically lowered, a large current flows through rectifier 23, and as a result thereof the base current in transistor 35 is very large to render it conductive.

It should be emphasized, that the circuit as provided, does not provide for a particular temperature compensation, as the temperature dependency of the characteristics of diode 25 contributes very little to the operation. The diode 25 is employed as a non-linear resistor, which permits selection of a D.C. biasing level at the output terminal 21 close to the B+ value without restricting the available and useful signal amplitude to a value below the difference between B+ and the D.C. bias level. The nonlinearity of the characteristic of the diode results in a large negative signal drop at point 21 which becomes necessary for establishing the enforced sinusoidal current input of the twin-T. This D.C. bias level (for room temperature) is selected to be sufficient above the value at which transistor 35 would conduct, so that a still possible lowering of the D.C. bias level at rising temperature will remain the transistor 35 in the cut off state for zero signal inputs in the tank circuit 10.

The overall operation is such that the position of the diode 25 causes establishing of a definite threshold level and transistor 35 begins to conduct at the instant when peak A.C. current fed back through the twin-T reaches D.C. bias. Any additional signal causes the twin-T loop to open at the negative peaks and full amplifier forward gain acting on the twin-T output waveform drives a huge peak pulse current into transistor 35.

Next the switching circuit 30 will be described in greater detail. Particularly, it shall be described how the switching signal when effective in transstor 35 is utilized further. Again we have to consider that the voltage B+ is a rather low one forcing certain operating conditions to be met. Transistor 35 pertains to a switching or pulse forming network, which is completed by a feedback path having a transistor 36 and which in effect provides for a regenerative signal clamping action.

Transistor 35 has its emitter electrode connected to the B+ voltage, and a divider network comprised of resistors 37 and 38 connects the collector electrode of transistor 35 to ground or zero potential. The junction between the resistors 37 and 38 leads to the base electrode of transistor 36, and the collector electrode thereof connects to the base electrode of transistor 35. The emitter of transistor 36 is connected via a resistor 39 to ground potential.

The switch 30 is provided for the control of a free running multivibrator 40. In particular, switch 30 when turned on is to cause the multivibrator to oscillate; switch 30 when off is to maintain multivibrator 40 in a stable, non-oscillating state. The turning on state of switch 30 is the operating state when a signal of frequency $f_0$ is picked up by tank circuit 10.

The multivibrator 40 has a natural frequency in the audible range and serves to energize a loudspeaker 50. The trigger or switching circuit 30 is an important part in the receiver system, as it is provided to assure a sudden starting and shutoff of the free-running multivibrator 40, and to eliminate a frequency decrease thereof which would invariably occur during a gradual turnoff. Such a frequency decrease is intolerable because the multivibrator frequency must always stay above the receiver input frequency to prevent regenerative magnetic feedback from the coil of speaker 50 to the loop antenna of tank circuit 10.

In the circuit shown, the rectifier diode 23 and capacitor 26 can be considered to be part of the peak detector acting on the A-C output as provided by the tuned amplifier 17 described above. Transistor 35 can be regarded as a D.C. amplifier amplifying the D-C signal developed by the rectifier diode 23. As the capacitor 26 is connected across 23, the potential at point 22 follows the oscillations at point 21 only to a negligible extent, so that throughout the reception of an input signal of frequency $f_0$, a uniform switching signal is applied to transistor 35 to maintain the transistor in the conductive state. Transistor 35 when rendered conductive is supposed to saturate, its collector reaching close to the B+ bias to control the free running multivibrator 40 as connected thereto at point 41.

In the absence of an input signal of frequency $f_0$, there is little current flowing through resistor 27 biasing rectifier 23 and point 22 close to the B+ potential. Transistor 35 is, therefore, cut off, and its collector potential is ground. The same holds true for base and emitter electrodes of transistor 36, so that transistor 36 is also cutoff, and no current flows whatsoever in switch 30, except for very small leakage currents.

Assuming now that a signal of frequency $f_0$ is picked up by the antenna loop in tank circuit 10. An A.C. signal is developed at the output of amplifier 17 as outlined above. As the A–C signal applied to rectifier 23 at point 21 grows, point 22 moves down from B+, and at about +1 volt transistor 35 starts to turn on. The collector voltage of transistor 35 rises, raising the base potential of transistor 36 through voltage divider 37 and 38.

When the base of transistor 36 reaches $\simeq$+0.6 volts, this latter transistor draws enough current through its emitter resistor 39 which current flows equally in the collector of transistor 36 to develop a significant drop across series connected resistors 27 and 28. This current also partly flows into the base of transistor 35 which soon reaches a lower incremental resistance than the combined resistances of resistors 27 and 28. This feedback is regenerative and the two transistors 35 and 36 both turn full on.

Transistor 35 saturates when its collector reaches $\simeq$+1.4 v. Because of the voltage divider action of resistors 37 and 38, the base of transistor 36 reaches about +0.9 volt. The collector of transistor 36 reaches about +1 volt, as determined by the base-emitter drop of transistor 35. The emitter of transistor 36 reaches about 0.4 volt, which is 0.5 v. below the base potential of transistor 36. Collector current and emitter current of transistor 36 are equal since this transistor is biased in the active region, determined by the proper choice of resistors 37 and 38. This collector current adds to the rectified signal developed at point 22 and keeps transistor 35 locked on, which is the principal purpose of transistor 36.

As the A-C signal is removed from the input terminals 21 or 22 the collector current from transistor 36 is not enough to develop turn-on voltage at the base of transistor 35 across resistors 27 and 28. Thus, resistor 39 is chosen so the circuit will not completely "lock on," but is still under the control of the input. When the input gradually goes away, the circuit will "snap" off regeneratively, which is the desired performance.

Having now established that a definite signal appears at the collector electrode of transistor 35 whenever a signal of frequency $f_0$ is received by antenna circuit 10, it will now be described how this resulting switching signal is finally utilized to produce an audible indication in loudspeaker 50. The state of conduction or non-conduction of transistor 35 is monitored by a voltage divider 44 having a junction 41 the potential of which is used particularly to bias the free running multivibrator 40. This multivibrator is comprised of the two transistors 42 and 43. The potential at junction 41 is applied through the resistor 45 to the base electrode of transistor 42. A capacitor 46 connects junction 41 to the collector electrode of transistor 43. The collector electrode of transistor 42 connects to the base electrode of transistor 43, and a resistor 47 biases the latter connection by connecting it to the B+ voltage.

A voltage divider comprised of three resistors 48, 49 and 52 connects the collector electrode of the transistor 43 to ground. The coil of loudspeaker 50 is connected across the resistor 48, and the emitter electrode of transistor 42 connects to the junction between the resistors 49 and 52.

The switch 30 thus controls the multivibrator 40 as follows: First consider the case when gate or switching transistor 35 is turned "off," no collector current flows through voltage divider 44, and point 41 has ground potential. Accordingly, transistor 42 is cut off as there is no collector current in transistor 42 and in resistor 47. No base-to-emitter voltage is applied to transistor 43, and the transistor is thus also cut off. Resistors 48, 49 and 52 and their junctions are all at ground potential. No current flows anywhere except for leakage currents of a few nanoamperes, thus providing for long battery life.

Next, consider what happens when switching transistor 35 is turned permanently "on." It will be recalled, that switch 30 is fast operating, and a potential of only little below the B+ potential is established at the collector transistor 35 with a very short rise time. As the collector voltage of transistor 35 rises close to the B+ voltage, less the emitter-collector drop at saturation, the potential in point 41 rises exponentially toward a value determined by the values of voltage divider 44. The time constant is determined by the parallel combination of the two portions of the voltage divider 44 across capacitor 46. The other end of capacitor 46 has the potential of the collector of transistor 43 which at that time is effectively grounded because transistor 43 is still cut off and the resistors 48, 49, 52 and the speaker 50 have a very low impedance as compared with divider 44.

As soon as the exponential rise at point 41 reaches approximately +0.5 volt, transistor 42 starts to conduct, its emitter was at ground and its collector at B+. As transistor 42 conducts, its collector current flows through resistor 47 and into the base of transistor 43 causing a greatly amplified current to flow in the collector of transistor 43. This current in the collector of transistor 43 is effective in two ways. It raises the collector voltage of transistor 43 and, therefore, the base voltage of transistor 42 via capacitor 46. The collector current of transistor 43 also raises the emitter voltage of transistor 42, in this case acting through resistor 52.

The raising of its base voltage acts to turn transistor 42 further on, and thus regenerative feedback is established. However, raising the emitter voltage (due to drop at resistor 52) tends to bias transistor 42 off, and thus degenerative feedback established also. The base potential of transistor 42 is raised through a greater absolute voltage swing than is its emitter, by the amount of drop in resistors 48 and 49. In other words, since the emitter voltage of transistor 42 is at a relatively lower tap of the voltage divider 48–49–52 than is its base (through 45 and 46), the voltage swing at the base of transistor 42 has to exceed the voltage at its emitter, and the overall feedback is, therefore, regenerative.

Finally, transistor 43 saturates and capacitor 46 has raised the potential at point 41 by about 1.3 volts from its starting point of +0.5 v. to about +1.8 volts. The emitter of transistor 42 is at +0.4 v. due to the drop across resistor 52. The base-emitter drop results in a particular potential at the base, and the potential difference across resistor 45 suffices for a current into the base of transistor 42 to maintain conduction therein. This is the situation just after switching "on" of both transistors, 42 and 43.

Subsequently capacitor 46 discharges and begins to charge inversely so that the potential of point 41 is dropping. The potential at base of transistor 42 hardly changes voltage, since the contribution of the transistor to any current flow in resistor 52 is negligible, and the base emitter drop of transistor 42 is fairly constant. The time constant of capacitor charging is established between capacitor 46 and the parallel combination of the two portions of divider 44 with resistor 45 being effective in parallel thereto. The resistors 48, 49 and 52 contribute only very little to the time constant.

The final voltage of this expontial change is attained when at approximately zero drop across resistor 45 the transistor 42 must turn off. This cut-off raises the base of transistor 43 instantly to B+ and this transistor will also cut-off. The collector voltage of transistor 43 goes negative, aided by the current in the speaker inductance, but this is incidental to the basic operation. The capacitor 46 couples a larger negative step to the base of transistor 42 than the concurrent negative step on the emitter thereof as resulting from the stoppage of current in resistor 52. Thus, transistor 52 is shut off practically instantly due to prevailing regenerative action analogous to the turn-on transient.

From here, point 41 charges up as originally, and the cycle is repeated. Thus, across resistor 48 there appears alternatingly voltage blocks each of a duration as determined by the period of conduction of transistor 43 and during this period capacitor 46 reverses its charge. When the potential at point 41 ceases to suffice to maintain transistor 42 conductive, regenerative switching means turn both of transistors off to establish the pause in between two voltage blocks. During this pause capacitor 46 reverses charge again to subsequently turn transistor 42 on and again by regenerative action transistors 43 and 42 are rendered conductive. Thus, the loudspeaker 50 will be energized by multivibrator action, and if the oscillator frequency is in the audible range, an audible signal will be produced.

The reason for tapping the emitter of the transistor 42 between resistors 49 and 52 instead of grounding it, is to enhance frequency stability of the multivibrator. If the emitter of transistor 42 were grounded, the operation would be identical at the start. When point 41 and the base of transistor 42 (no current flow in resistor 45 when transistor 42 is cut off) attain a potential the value of which cause switching, transistor 42 would turn on, and regeneration through capacitor 46 would further turn on the transistor. But it may never turn off. The "final" voltage of the divider 44 has to be above the turn-on voltage of transistor 42 to start conducting. This would keep the transistor on forever, unless the "final" voltage of the exponential rise at its base were set, by adjustment of the divider to be right at +0.5 v. Then it would barely turn on as the exponentially rising voltage reaches final value, and barely turns off as the negative-going exponential reaches the same final value.

The square wave superimposed on the emitter of transistor 42 due to tapping allows the exponential to head for the same final value, with respect to ground, in each direction, but switching will occur long before it reaches that point, so that triggering occurs in the sloping part of the exponential curve and this, in turn, ensures period time stability.

The invention is not limited to the embodiments described above but all changes and modifications thereof not constituting departures from the spirit and scope of the invention are intended to be covered by the following claims.

I claim:

1. A low voltage operated paging receiver, comprising: an amplifier circuit having input and output terminals; antenna means connected to said input terminals for receiving signals of a particular frequency;

a non-linear circuit device connected with one of its ends to said output terminal;

a narrow band stop filter, including said particular frequency in its stop band and being connected with its input side to the other end of said device and being further connected with its outside to said antenna means;

signal means for providing an indicating signal; and circuit means connecting said signal means to said non-linear device for normally disabling said signal means as long as said antenna means does not receive said particular frequency, and to render said signal means responsive to the distortions of signals produced by said non-linear device when said antenna means receives said particular frequency.

2. A low voltage operated circuit network comprising:

a loop circuit which includes, in sequence, a high gain amplifier, a nonlinear ohmic impedance device, a narrow bandstop filter, and a signal source responsive to a particular frequency in a passband and connected to said amplifier for closing the loop;

biasing means to establish a first, quiescent signal level at a terminal of said nonlinear device, so that a signal of asymmetrical waveform develops across said nonlinear device when said source provides said particular frequency in said passband; and switching means connected to said terminal and having a state of non-conduction at said signal level, and being rendered conductive in response to occurrence of pronounced excursions of said asymmetrical signal when developed at said terminal.

3. A network as set forth in claim 2, said switching means including means responsive to said excursions to provide a steady switching signal for the duration of said particular frequency when provided by said source, said switching means further including a first transistor having its base electrode connected to be rendered conductive by said switching signal and a second transistor connected to provide a regenerative feedback loop with said first transistor.

4. A signalling apparatus for connection between two voltage supply terminals, comprising:

a first transistor;

first resistance means for serially connecting the emitter collector path of said transistor between said terminals;

a second transistor having its emitter collector path connected between the base electrode of said first transistor and one of said terminals;

second resistance means for connecting said base electrode of said first transistor to the other one of said terminals;

circuit means for applying a voltage drop developed across at least a portion of said first resistance means regeneratively to the base electrode of said second transistor to enforce concurrent conduction and nonconduction of the two transistors;

first signal means for applying a D-C enabling potential to one of the base electrodes; and second signal means responsive to the voltage developed across said first resistance means, to provide an operating signal.

5. Apparatus as set forth in claim 4, said first signal means including voltage divider means operatively connected between said terminals, and having a tap connected to the base electrode of said second transistor, said circuit means including a capacitor which establishes an RC network that includes said divider means to alternate its charging states depending upon conduction and nonconduction of said two transistors.

6. Apparatus as set forth in claim 4, said first signal means including a rectifier having its output side connected to the base electrode of said first transistor, further including A.C. signal responsive means to provide an A.C. voltage to said rectifier, which when rectified causes said rectifier to apply the D.C. enabling voltage to said base of said first transistor.

7. A low powered, signal responsive device, comprising:

a transistor amplifier having input and output terminals;

means connected to said input terminal and being responsive to a signal having a characteristic frequency for controlling the input side of said amplifier;

circuit means having a non-linear voltage-current characteristics and being connected with one end of said output terminal;

electronic switching means connected to said circuit means and said output terminal;

biasing means for maintaining said electronic switching means disabled when no signal of said characteristic frequency is applied to said amplifier; and a narrow bandstop filter having said characteristic frequency in its passband and being connected to the other end of said non-linear circuit means to provide feedback to the input side of said amplifier.

8. A signalling apparatus comprising, in combination:

first signal means responsive to a signal having a particular frequency and producing an A-C signal representative thereof, and including nonlinear means to distort said A-C signal with amplitude excursions of one polarity being larger than in the opposite direction relative to a particular D-C level of reference;

second signal means responsive to first and second input signals for providing outputs respectively indicative of presence of said first and second input signals; and circuit means for coupling said first signal means to said second signal means and being responsive to said large amplitude excursions to provide said first input signals, and being responsive to absence of said A-C signal to provide said second input signals in response to said particular level of reference.

9. A signalling apparatus comprising, in combination:

first signal means responsive to a signal having a particular frequency and producing an A-C signal representative thereof, and including nonlinear means to distort said A-C signal with amplitude excursions of one polarity being larger than in the opposite direction relative to a particular D-C level of reference;

circuit means for providing said particular level of reference, and including means to provide a first switching signal when said first signal means does not receive said signal of particular frequency, and to provide a second switching signal in response to said larger ampliture excursions when said firt signal receives said signal of particular frequency; and second signal means responsive to said first and second switching signals for providing an indication of respective absence and presence of reception of said signal of particular frequency by said first signal means.

10. In a signalling apparatus, comprising: in combination:

first signal means responsive to a signal having a particular frequency and producing an A.C. signal representative thereof, said A.C. signal as produced having a distorted waveform with amplitude excursions of one polarity being larger than in the opposite direction relative to a particular D.C. level of reference;

circuit means for providing said particular level of reference, and including means to provide a first switching signal when said first signal means does not receive said signal of particular frequency, and to provide a second switching signal in response to said larger amplitude excursions when said first signal means receives said signal of particular frequency;

switching means responsive to said first and second switching signals to respectively assume first and second switching states; and an oscillator connected to said switching means and being enabled at said first switching state and disabled at said second switching state, to provide oscillations when enabled whereby at a change from said first to said second switching state by said switching means occurring at a particular half wave of oscillations produced, the production of a succeeding half wave of opposite polarity is substantially prevented.

11. In a signalling apparatus, comprising:

a first transistor circuit having input and output sides for providing an A.C. output when a signal of particular frequency is applied to said input while maintaining a steady potential at said output upon absence of said signal at said input;

circuit means including a diode connected to said output side and being included in said transistor circuit, for providing a particular level for said steady potential and imparting upon said A.C. output an asymmetrical waveform; and a second transistor circuit having a plurality of transistors and being connected to said diode and to said output, said transistors being maintained at a state of non-conduction when said potential at said particular level is provided in the absence of said particular frequency signal, and including means responsive to said asymmetrical A.C. output to render at least some of said transistors conductive for the duration of said signal of particular frequency.

12. In a signalling apparatus, there being two low voltage supply terminals:

a first transistor;

a resistor means connected in series with the emitter-collector path of said first transistor, said transistor and resistor means connected across said supply terminals;

second resistor means for connecting the base electrode of said transistor to one of said terminals;

signal means for applying a control voltage to said second resistor means to initiate base current into said first transistor;

a second transistor having its emitter collector path resistively connected between the base electrode of said first transistor and the other one of said terminals; and means for connecting the base electrode of said second transistor to said first resistor means to apply additional base current to said first transistor in response to the current flowing through said first resistor means, but insufficient to maintain said first transistor conductive in the absence of a control voltage from said signal means.

13. In a signalling apparatus, a first transistor;

a resistor connected to the collector electrode of said transistor;

a diode connected with one of its electrodes to said collector;

a second transistor;

circuit means connected to said electrode of said diode and to the base electrode of said second transistor, to bias second transistor to a cut off D.C. potential and said diode to a point in its non-linear characteristics;

a narrow bandstop filter connected with its input side to the other electrode of said diode; and gain producing circuit means for connecting the other end of said filter to said first transistor.

14. A signal responsive device for operation with a low voltage source comprising:

a transistor amplifier having input and output terminals;

first circuit means for connection to the voltage source for biasing said output terminal to a D.C. voltage level close to that of the source voltage;

a semiconductor switch having enabled and disabled states;

second circuit means including said first circuit means for connecting said output terminal to said semiconductor switch, to be disabled at said biasing level;

narrow bandstop filter feedback means connected to said input terminal of said amplifier;

a non-linear circuit device for connecting said terminal to said filter means, to provide D.C. continuity from said output terminal into and through said filter means; and signal means for providing a signal having bandpass frequency to the input of said amplifier to thereby cause an asymmetrical voltage to be applied to said switch through said second circuit means for operation of said switch.

15. A low powered signal device, comprising:

a high gain transistor amplifier having input and output terminals;

a first transistor;

rectifier means for connecting said output terminal to the base electrode of said first transistor;

biasing means including a nonlinear circuit element to provide a biasing level at said output terminal sufficient to prevent conduction of said first transistor;

a narrow bandstop filter connected to said output terminal via said non-linear element and to said input terminal of said amplifier, providing D.C. continuity thereto;

signal means to provide a signal having a frequency in said band to the input side of said amplifier, to cause development of an asymmetrical voltage at said rectifier, and thereby to turn said first transistor on;

a second transistor connected to said first transistor to regeneratively cause fast saturation upon development of said voltage and to complete blocking upon discontinuance of reception of said signal within approximately a cycle of said signal;

an oscillator connected to said first transistor and being disabled respectively upon conduction and nonconduction of said first transistor; and a loudspeaker operated by said oscillator.

16. A receiver circuit, comprising:

a high gain transistor amplifier;

tuned antenna means connected to the input side of said amplifier;

a twin-T filter having its bandstop peak at a frequency in the passband of said antenna means, further having its output side connected to the input side of said amplifier;

a diode connected between the output side of said transistor amplifier and the input side of said twin-T filter to provide D.C. continuity;

switching means connected to the output side of said amplifier; and biasing means for said diode and switching means to maintain said switching means disabled as long as said tuned frequency is not received by said antenna means, thereby biasing said diode to a state so that upon receiving a signal of said frequency a sinusoidal current will result through the diode and and asymmetrical voltage of pronounced peaks in one direction will be produced to which said switching means responds.

17. A paging receiver, comprising:

first signal means including antenna responsive to a signal having a particular frequency, and developing a D-C signal upon reception of a signal of said particular frequency by said antenna means;

a first transistor having its base electrode connected to be responsive to said D-C signal;

a source of D-C voltage having two output terminals;

first resistance means for serially connecting the emitter collector path of said transistor between said terminals;

a second transistor having its emitter collector path connected between the base electrode of said first transistor and one of said terminals;

second resistance means for connecting said base electrode of said first transistor to the other one of said terminals;

circuit means for applying a voltage drop developed across at least a portion of said first resistance means regeneratively to the base electrode of said second transistor to enforce concurrent conduction and non-conduction of the two transistors; and second signal means responsive to the voltage developed across said first resistance means, to provide an operating signal.

18. A battery operated low power drain receiver comprising:

an active, narrow bandpass, frequency selective filter network including input and output circuits, the input circuit being responsive to peak passband frequency signals, the output circuit providing an asymmetrical signal in response thereto, said asymmetrical signal having pronounced excursions in one direction and oscillating about a reference level corresponding to a potential close to the potential of one of the battery terminals;

a regenerative transistor switch connected to said output circuit and to the battery to be rendered conductive by said excursions and being cut off when said signal is not received, said switch when conductive providing an operating potential, and when cut off providing a potential close to the potential of one of the terminals of the battery;

a free running transistor oscillator connected to the battery and having active components and a natural frequency in the audible range, the oscillator being connected to said switch to be maintained in a state of non-conduction of any oscillator circuit component when said switch is cut off while the operating potential of said switch enables said oscillator; and transducer means responsive to the output of said oscillator.

19. A receiver as set forth in claim 18, the active filter network comprising a loop circuit that includes in serial arrangement a high gain amplifier, a diode, a twin-T filter and a tuned antenna circuit, there being biasing means to D.C. bias said diode into its non-linear region of conduction.

20. A receiver as set forth in claim 18, said transistor switch including a first transistor having its base electrode connected to the said output circuit to be responsive to said reference level maintaining said first transistor non-conductive, and a second transistor connected with its base electrode to one of the emitter and collector electrodes of said first transistor for concurrent conduction and non-conduction, and having one of its two other electrodes connected to said base of said first transistor to provide regenerative feedback.

21. A receiver as set forth in claim 18, said free running oscillator comprising a first and second transistor connected so that the collector electrode of the first transistor controls the base potential of the second transistor so that the first and second transistors have similar states of conduction or non-conduction;

an RC circuit connecting the collector electrode of the second transistor to the base electrode of the first transistor; and circuit means for providing the operating output potential of said switch to said RC circuit so that the capacitance of the RC circuit tends to change its charge towards a charging state, changing the state of conduction of said first and second transistors.

22. In a receiver circuit, a class A amplifier having a transistor output stage and an output terminal for D.C. connection to a biasing voltage source;

a narrow bandstop filter;

a nonlinear ohmic impedance device for connecting said output terminal to the input side of said bandstop filter;

input signal means for connecting the output side of said bandstop filter to the input side of said amplifier; and switching means connected to said output terminal.

23. In a receiver circuit, a class A amplifier having a transistor output stage and an output terminal for D.C. connection to a biasing voltage source;

a narrow bandstop filter;

a nonlinear ohmic impedance device for connecting said output terminal to the input side of said bandstop filter;

antenna means connected to the input side of said class A amplifier and to the output side of said filter;

switching means connected to said impedance device to be responsive to unidirectional signal distortions produced by said impedance device when said antenna means picks up a signal having the freqency in the stopband of said filter; and indicating means operated by said switching means.

References Cited

UNITED STATES PATENTS 3,017,631 1/1962 Fink ---------------- 343—225

KATHLEEN H. CLAFFY, Primary Examiner

BARRY PAUL SMITH, Assistant Examiner

U.S. Cl. X.R.

325—55